US008645932B2

(12) United States Patent
Wright et al.

(10) Patent No.: US 8,645,932 B2
(45) Date of Patent: *Feb. 4, 2014

(54) CONTROL FLOW ANALYSIS METHODS AND COMPUTING DEVICES FOR CONVERTING COBOL-SOURCED PROGRAMS TO OBJECT-ORIENTED PROGRAM STRUCTURES

(75) Inventors: Jeremy Wright, Newbury (GB); Robert Sales, Newbury (GB)

(73) Assignee: Micro Focus (US). Inc., Rockville, MD (US)

( * ) Notice: Subject to any disclaimer, the term of this patent is extended or adjusted under 35 U.S.C. 154(b) by 316 days.

This patent is subject to a terminal disclaimer.

(21) Appl. No.: 13/236,574

(22) Filed: Sep. 19, 2011

(65) Prior Publication Data
US 2012/0096444 A1 Apr. 19, 2012

Related U.S. Application Data

(60) Provisional application No. 61/384,668, filed on Sep. 20, 2010, provisional application No. 61/384,310, filed on Sep. 19, 2010.

(51) Int. Cl.
*G06F 9/45* (2006.01)
(52) U.S. Cl.
USPC .......................................... 717/146; 717/140
(58) Field of Classification Search
USPC .................................................. 717/136–161
See application file for complete search history.

(56) References Cited

U.S. PATENT DOCUMENTS

| 4,567,574 | A | 1/1986 | Saade et al. |
| 5,778,232 | A | 7/1998 | Caldwell et al. |
| 6,453,464 | B1 | 9/2002 | Sullivan |
| 6,523,171 | B1 | 2/2003 | Dupuy et al. |
| 7,386,840 | B1 | 6/2008 | Cockerham et al. |
| 8,370,820 | B2 | 2/2013 | Guenthner et al. |
| 8,438,511 | B1 | 5/2013 | Tonkin et al. |
| 2006/0031820 | A1 | 2/2006 | Li |
| 2009/0064091 | A1 | 3/2009 | Tonkin et al. |
| 2011/0093837 | A1 | 4/2011 | Guenthner et al. |

OTHER PUBLICATIONS

U.S. Appl. No. 13/236,578.
Masim Mossienko, "Automated Cobol to Java Recycling", Proceedings of the Seventh European Conference on Software Maintentance and Reengineering (CSMR'03) (10 pages) (2003).
Toshio Suganuma et al, "Performance Pitfalls in Large-Scale Java Applications Translated from COBOL", OOPSLA'08, pp. 685-696, Oct. 19-23, 2008.
John Field et al, "Identifying Procedural Structure in Cobol Programs", PASTE'99, Sep. 1999, pp. 1-10.
"Chapter 15: Procedure Division—Perform—Rollback", http://supportline.microfocus.com/Documentation/books/nx30books/lrpdfb.htm, (27 pages) (1998).

*Primary Examiner* — Qing Chen
(74) *Attorney, Agent, or Firm* — DLA Piper LLP US

(57) ABSTRACT

The various embodiments of the invention relate generally to computer software, computer program architecture, software development, and computer programming languages, and more specifically, to techniques for analyzing control flow in COBOL-sourced programs to facilitate optimized conversions to object-oriented program structures. For example, a compiler can include a global optimizer configured to analyze execution flow for a range of blocks of source code in the memory to determine flow-affected code. Also, the compiler can include a native code generator configured to generate native code based on representations of the native code as functions of the source code. The native code is configured to execute on a virtual machine.

22 Claims, 10 Drawing Sheets

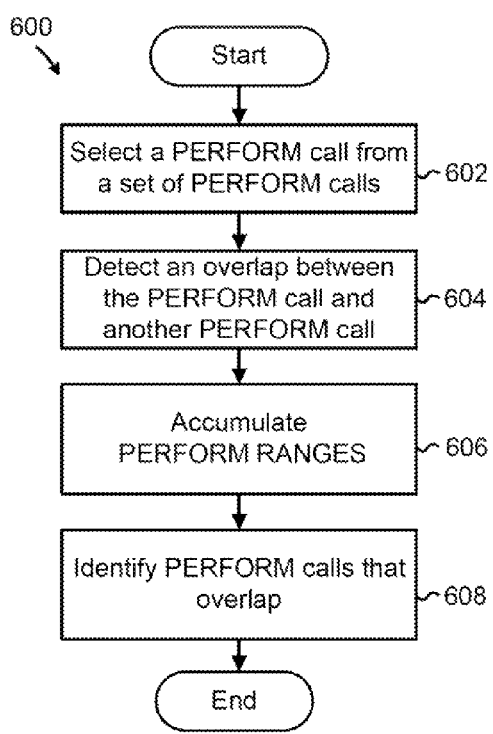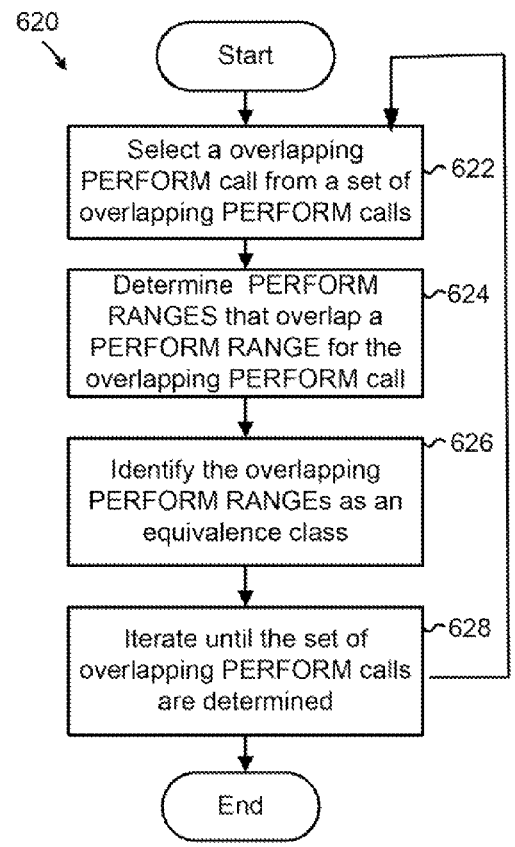
FIG. 6A
FIG. 6B

CONTROL FLOW ANALYSIS METHODS AND COMPUTING DEVICES FOR CONVERTING COBOL-SOURCED PROGRAMS TO OBJECT-ORIENTED PROGRAM STRUCTURES

CROSS REFERENCE TO RELATED APPLICATIONS

This application claims the benefit U.S. Provisional Application No. 61/384,310, entitled "Perform Analysis and Method Splitting in COBOL-Sourced Programs for Conversion to Object-Oriented Program Structures" and filed on Sep. 19, 2010, and U.S. Provisional Application No. 61/384,668, entitled "Perform Analysis and Method Splitting in COBOL-Sourced Programs for Conversion to Object-Oriented Program Structures" and filed on Sep. 20, 2010, all of which are incorporate herein by reference for all purposes.

FIELD

The various embodiments of the invention relate generally to computer software, computer program architecture, software development, and computer programming languages, and more specifically, to techniques for analyzing control flow in COBOL-sourced programs to facilitate optimized conversions to object-oriented program structures.

BACKGROUND

In the field of software development, many computer programs or applications of early origin are often written in less useful and less technically powerful languages than those written today using a variety of object-oriented applications. Many of these programs, often referred to as "legacy" applications are written using earlier-developed programming languages that may be relatively difficult to use and deploy over various hardware and computing systems. Legacy applications usually have more complicated structures than their contemporary analogs. In other words, legacy applications were often more difficult to develop, maintain, and update, expensive to create, and required extensive time and developer resources than contemporary applications.

Further, many legacy programs are not optimized in terms of control flow information, which can govern how well a program executes. In programming languages like COBOL, conventional applications typically have a relatively high degree of inherent flexibility in the structure of the application. With such applications, however, developers have an increased opportunity to create applications that are structured in a manner that affects program flow control, as well as the control flow analysis as applied to legacy applications. For example, control flow analysis traditionally operates upon rooted directed graphs. In a well-structured program, each perform range can be modeled by a rooted directed graph, which normally leads to effective and efficient code optimization. But the above-described conventional techniques do not operate well on loose-structured programs, examples of which include the development of COBOL programs.

The advent of object-oriented languages, such as Java™ from Sun Microsystems™ (now a division of Oracle™), and "rich" graphical user interfaces have fueled rapid development cycles for designing, building, and programming a variety of applications for a variety of users, including end consumers and enterprises, with little to no emphasis on the hardware upon which the applications might execute. Unfortunately, legacy applications require a conversion to make them compatible with contemporary programming applications. Such conversions typically require extensive resources to convert the legacy applications to more contemporary and useful object-oriented programming schema or structures.

Conventionally, the relative flexibility in control structures inherent in legacy applications, such as COBOL, may complicate a conversion into, for example, another programming language. In particular, the relatively loose structure of COBOL can lead to unpredictable control flow of the code during execution. For example, the liberal use of "alter" statements in connection with COBOL paragraphs (i.e., an alterable paragraph) may result in complicated and inefficient flow of executable code. Similarly, the use of instructions that change the control without properly returning control flow back to the point of origination can disrupt or complicate the flow of executable code.

Thus, what is needed is a solution for optimizing legacy applications developed using earlier computing programming languages, including COBOL, without the limitations of the conventional techniques.

BRIEF DESCRIPTION OF THE DRAWINGS

Various embodiments or examples ("examples") are disclosed in the following detailed description and the accompanying drawings:

FIGS. 6A and 6B illustrate examples of a technique for determining overlapping PERFORM ranges, according to some embodiments;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. The described techniques may be varied and are not limited to the embodiments, examples or descriptions provided.

Figure 1:
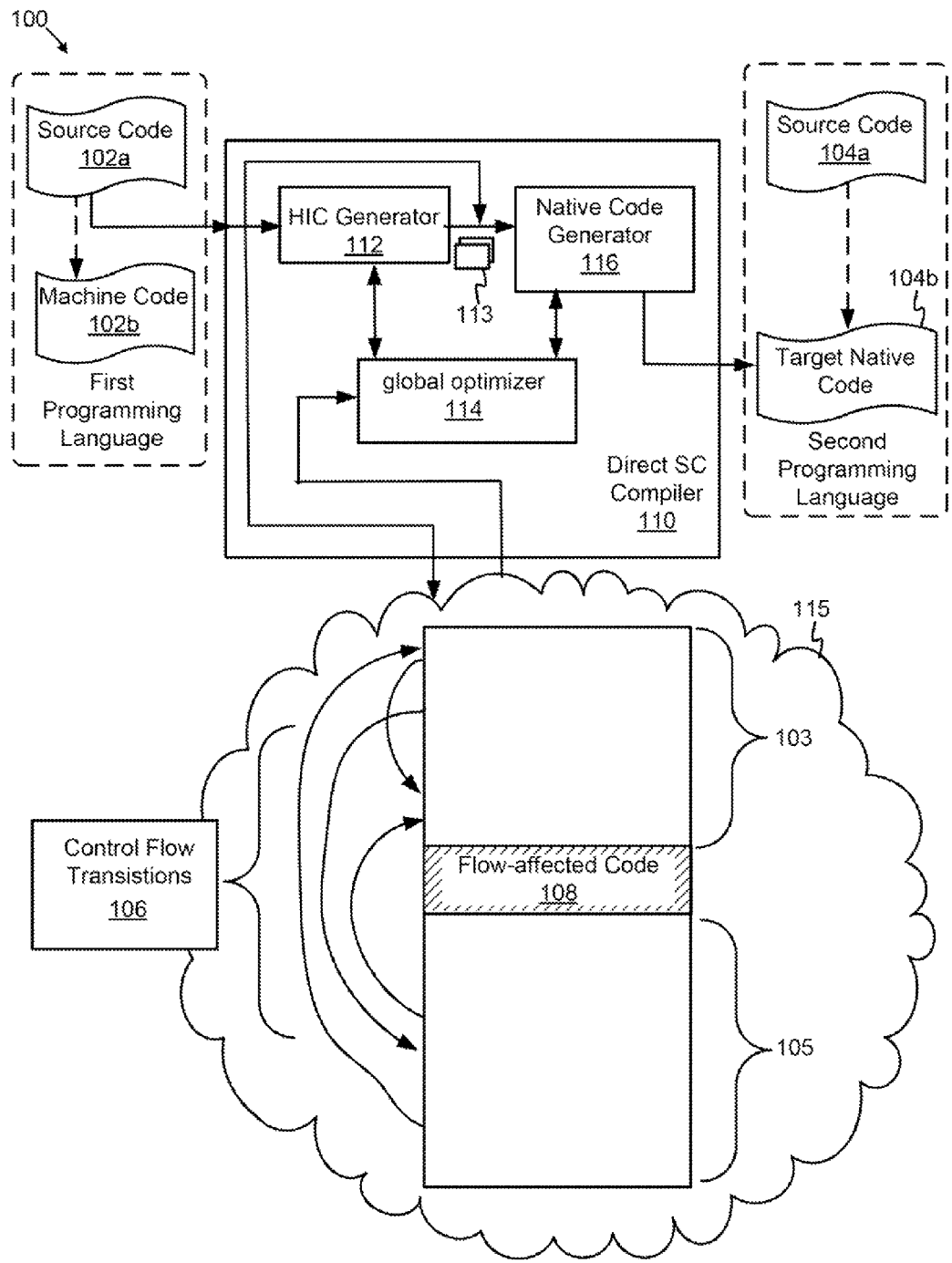
FIG. 1 illustrates an exemplary system for analyzing code in a first programming language for conversion into native code of a second programming language, according to some embodiments.

FIG. 1 illustrates an exemplary system for analyzing and/or optimizing code in a first programming language for conversion into native code of a second programming language, according to some embodiments. System 100 includes a direct source code ("SC") compiler 110 configured to convert source code 102a in a first programming language into a target native code 104b directly. Direct source code compiler 110 includes a hardware-independent code ("HIC") generator 112 coupled to a global optimizer 114 and a native code generator 116. Hardware-independent code generator 112 is configured to convert instructions of source code 102a into transitional code 113 that can be passed to native code generator 116. Or, instructions of source code 102a can be passed directly to native code generator 116. Hardware-independent code generator 112 is optional and thus is not required for implementing system 100 and its elements. Regardless, native code generator 116 is configured to generate target native code 104b in a second programming language, such as Java®. Global optimizer 114 is configured to analyze and characterize the control flow of instructions in code space 115 during execution, including simulations thereof. Global optimizer 114 is configured further to detect issues with control flow due to, for example, an ill-structured application developed and coded in the first programming language, such as COBOL, and to optimize the control flow so as to facilitate an effective conversion into target native code 104b.

In view of the foregoing, the structures and/or functionalities of system 100 and its elements can facilitate an optimized, "direct conversion" of source code 102a into target native code 104b, whereby the second programming language can be an object-oriented language operative, for example, with a virtual machine. Therefore, a conversion of source code 102a into source code 104a of the second programming language is not required, thereby preserving computational resources as well as other development resources. System 100 and its elements can identify instructions modifying control flow in a manner that might otherwise exacerbate the behavior of the execution of source code 102a, thereby creating portion of source code that are unreachable. As part of its optimization functions, system 100 and its elements can omit the unreachable code or perform other optimizations to enable conversion of source code 102a into a well-structured program in the second programming language. Therefore, system 100 and its elements can convert an ill-structured program into a well-structured program, and, thus, can convert a COBOL application into a Java® application. By converting source code 102a into well-structured target native code 104b, relatively large (or small) blocks of source code 102a can be transformed into smaller (or larger) blocks of target native code 104b. For example, COBOL programs that can have a relatively large number of lines of code can be subdivided into smaller methods, such as 64 kb-sized methods. This size can be well-suited for adaptation into another programming language, such as Java®. Further, the formation of a well-structured object-oriented program facilitates the application of just-in-time ("JIT") compilation techniques based on COBOL source code 102a, whereby JIT compilation techniques are better-suited to process smaller-sized methods efficiently.

As used herein, the terms "directly convert" and "direct conversion" can refer, in some examples, to the conversion to target native code 104b without converting source code 102a to source code 104a of the second programming language. Further, a "direct conversion" can exclude the use of machine code 102b in the first programming language. Note that a direct conversion can be a conversion of source code 102a directly into target native code 104b. Optionally, a direct conversion can include conversion of source code 102a into transitional code 113 prior to conversion into target native code 104b. As used herein, the term "native code" can refer, in some examples, to bytecode configured to execute on a virtual machine or other software-implemented machines. An example of a virtual machine is a Java Virtual Machine ("JVM"). Further, native code can also refer, in some examples, to machine level code that has been compiled to execute with specific computing hardware. As used herein, the terms "instruction," "statement," "call," "command," and other like terms describe code that can be executed or preformed. These terms can be used interchangeably with each other, according to some embodiments.

Hereinafter, system 100 and its elements are described in the conversion from source code in COBOL programs, as well as COBOL-variants (e.g., Micro Focus COBOL, IBM OS/VS COBOL, ANSI COBOL, etc.), to native code in Java® and other object-oriented programs. But in no way does the following discussion limit the various features to COBOL and Java®. Rather, system 100 and its elements can be implemented to convert source code in any first programming language into bytecode (or machine code) associated with any second programming language, including object-oriented languages. As the various embodiments provide for the optimization of the control flow, a PERFORM range can be adjusted to omit flow-affected (e.g., unreachable) code. Also, the adjusted PERFORM range can be subdivided into small portions, such as 64 kb portions.

Hardware-independent code generator 112 can be configured to directly convert COBOL source code 102a into Java® bytecode. In particular, hardware-independent code generator 112 can generate Java classes or class files as transitional code 113. Therefore, the Java classes or class files are created from COBOL source code 102a rather than being compiled using Java source code 104a. The class files (e.g., .class files) then can be loaded as target native code 104b into a Java Virtual Machine ("JVM") for execution. In some embodiments, hardware-independent code generator 112 can be implemented using syntactic structures and relationships that relate COBOL source code 102a to Java bytecode 113. For example, hardware-independent code generator 112 can include an abstract syntax tree ("AST") for COBOL source code 102a, whereby nodes in the AST can represent a construct in COBOL source code 102a. The AST is used to convert COBOL to equivalents in Java® bytecode. Native code generator 116 can be configured to transform Java bytecode 113 into target native code 104b. In this example, target native code 104b is executable code (e.g., machine language) specific to a particular hardware architecture and/or operating system. Target native code 104b can be formatted in different ways and can be linked with other portions of code, such as other objects or archives to produce executables (e.g., .exe files) or shared libraries (e.g., .dll files).

Global optimizer 114 can be configured to analyze the changes in control flow resulting from executing or processing COBOL instructions or statements in code space 115. Changes in control flow are depicted as control flow transitions 106 in FIG. 1. Control flow transitions 106 are disruptive to the conversion process from source code 102a to target native code 104b as they can modify control flow in a manner that results in at least some of COBOL source code 102a being unreachable. The unreachable COBOL source code, which is depicted as flow-affected code 108, includes source code that cannot be executed due to control flow transitions 106 emanating from instructions or statements that are processed in reachable portions 103 and 105. Conversion of unreachable code that cannot be executed adds an unnecessary burden to the conversion by system 100 and its elements. Thus, global optimizer 114 can be configured to identify instructions that give rise to flow-affected code 108 and optimize the control flow by, for example, omitting flow-affected code 108 or taking other actions to rectify flow-affected code 108 (e.g., by converting unreachable source code into reachable source code).

To illustrate the functionality of global optimizer 114, consider that global optimizer 114 is configured to analyze and to optimize the control flow of PERFORM statements as COBOL source code 102a instructions. A PERFORM statement is an instruction or a command that transfers control (e.g., explicitly) to one or more instructions and returns control (e.g., implicitly) to the next executable instruction after execution of the instructions called by the PERFORM statement is finished. As such, a PERFORM statement transfers the control flow to the next instruction in sequence, immediately following the termination of the PERFORM statement. PERFORM statements provide for the execution of one or more instructions in "Paragraphs." A number of "Paragraphs" can constitute a "Section." As instructions in a Section can be executed by calling a PERFORM statement, the use of a PERFORM statement is used to develop COBOL code modules, each of which can be called using PERFORM.

Global optimizer 114 analyzes a PERFORM statement and determines the PERFORM range and corresponding instructions to be executed. During its analysis, global optimizer 114 identifies one or more instructions that changes control flow in the execution of the COBOL code subsequent to the PERFORM call. Global optimizer 114 then determines whether the one or more instructions in the PERFORM range induces or creates flow-affected code 108, thereby determining unreachable code. Examples of instructions that induce or create flow-affected code 108 include non-returning instructions, and the like. As used herein, the term "non-returning instructions" can refer, in some examples, to the change in the control flow without providing (e.g., implicitly) for the return from which control deviated. A GOTO statement is one such non-returning instruction. Thereafter, global optimizer 114 forms an adjusted PERFORM range for the PERFORM statement called based on the reachable regions, with the unreachable code being omitted. Global optimizer 114 can also analyze and optimize other control flow issues associated with the PERFORM statement, such as discussed below regarding overlapped PERFORM ranges.

Figure 2:
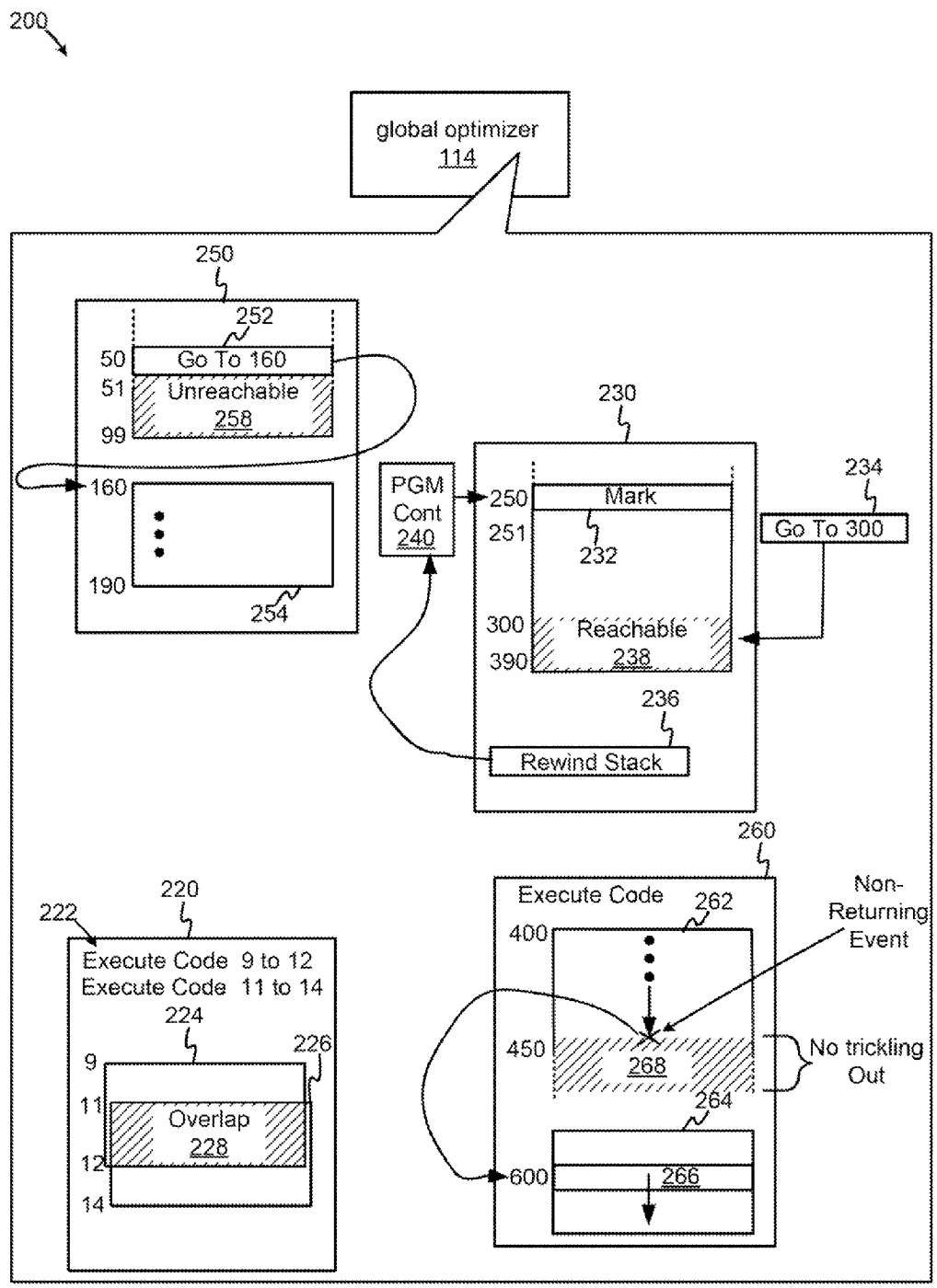
FIG. 2 illustrates examples of changes in control flow that a global optimizer analyzes, according to some embodiments.

FIG. 2 illustrates examples of changes in control flow that a global optimizer analyzes, according to some embodiments. Diagram 200 depicts global optimizer 114 diagrammatically performing analysis in connection with the changes of control flow during execution of a PERFORM instruction. Global optimizer 114 analyzes code portion 250 and identifies an instruction 252 that transfers the control flow to another part 254 of code portion 250. In the example shown, a GOTO statement that transfers control beyond or outside the range of the executing PERFORM instruction likely will skip over the exit point for the PERFORM instruction. Therefore, the control flow likely is transferred erroneously, thereby giving rise to unreachable code 258. Another example of such an instruction is an ALTER statement, which changes the control flow of a GOTO statement in a COBOL program based on, for example, a condition or the state of the code when the ALTER statement is executed.

Global optimizer 114 analyzes code portion 260 and identifies an instruction causing the control flow to either unconditionally transfer out of the PERFORM statement or unconditionally perform one or more instructions including a non-returning function. The instruction executed in part 262 of code portion 260 can be viewed as a non-returning event that transfers control to execute instruction 266 in another part 264 of code portion 260. As depicted, the control flow does not trickle out of the PERFORM range (e.g., through the end point) associated with the PERFORM instruction in part 262. As such, code 268 may be unreachable. Therefore, global optimizer 114 can identify code 268 through which the control flow may not trickle.

Global optimizer 114 analyzes code portion 220 to identify potential optimization opportunities for enhancing control flow for converting COBOL source code into object-oriented executable code. In the example shown, two PERFORM instructions 222 cause code execution to overlap. A first PERFORM range 224 includes instructions for a first PERFORM instruction, whereas a second PERFORM range 226 includes instructions for a second PERFORM instruction, whereby code execution overlaps at overlap area 228. Code in overlap area 228 may have multiple entry points and multiple exits points. Once overlap area 228 is identified, global optimizer 114 can optimize the control flow by for example, transforming the union of area 224 and area 226 into code that has, for example, a single entry point and a single exit point, and, thus, is well-structured.

Figure 3:
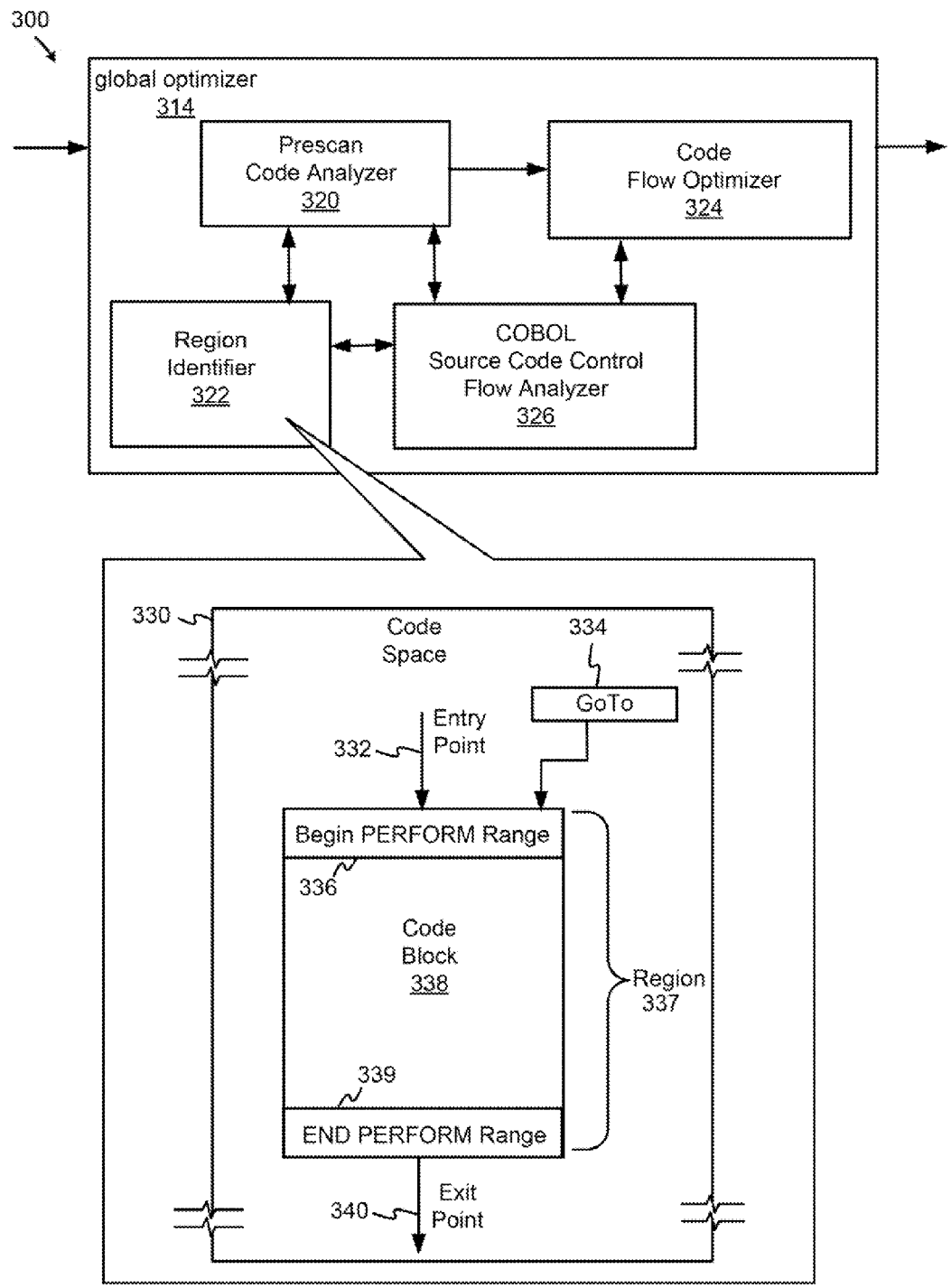
FIG. 3 illustrates an example of a global optimizer, according to some embodiments.

FIG. 3 illustrates an example of a global optimizer, according to some embodiments. Diagram 300 depicts global optimizer 314 diagrammatically identifying blocks of code referred to as "regions." Global optimizer 314 is configured to calculate the PERFORM range for a given PERFORM instruction, and also identifies the reachable code. As used herein, the term "PERFORM range" can refer, in some examples, to an amount of code (e.g., number of lines or paragraphs) encompassed or reached by a single PERFORM instruction. Consequently, global optimizer 314 can determine the unreachable code that can be omitted from the direction conversion of COBOL source code to native code for Java®. As shown, global optimizer 314 includes a prescan code analyzer 320, a region identifier 322, a code flow optimizer 324, and a COBOL source code control flow analyzer 326.

Region identifier 322 is configured to identify individual blocks of code 338 in code space 330 that are associated with a PERFORM instruction. A region 337 can include contiguous or substantially contiguous lines of code, similar to a Paragraph in COBOL. Region identifier 322 identifies regions 337 delimited by an entry point 332 and a target of the control flow that bypasses or does not pass through entry point 332 (e.g., an EXIT instruction). As shown, an entry point 332 demarcates the start of a region as well as subsequent regions. Or, the target paragraph of a GOTO instruction 334 can specify the start of a region 337. Alternatively, the start of a Paragraph that also is the START 336 of a PERFORM range can define the beginning of region 337. An exit point 340 of region 337 can be specified as an end of a Paragraph that is also the END 339 of a PERFORM range. In some cases, a PERFORM can be represented by a tuple of regions 337, whereby the first value is the region at the beginning of the PERFORM range, and the second value is the region at the end of the perform range. A PERFORM range may start and end with different regions if the PERFORM instruction includes multiple paragraphs, or contains, for example, an entry point.

Prescan code analyzer 320 is configured to perform a prescan of a COBOL source code program to analyze the regions to determine: one or more PERFORM instructions associated with a region, and whether any instruction in the region affects the flow of executable code. In some embodiments, prescan code analyzer 320 is configured to generate attributes that characterize the COBOL source code and serve as inputs into COBOL source code control flow analyzer 326. First, prescan code analyzer 320 generates a set of regions, SET (goto), that are directly reachable from a specific region, R, by a GOTO instruction, which also includes GOTO DEPENDING instructions, other GOTO instruction variants, all targets of an ALTERable GOTO instruction, and other like instructions. Second, prescan code analyzer 320 is configured to generate a set of regions, SET(trickle), that contains regions that control flow would trickle into, if control trickled into a region, R. Note that if control flow cannot "trickle out" of any region, then the set is a null set. Control flow in a region, R, does not trickle out if it contains an unconditional transfer of control out of the program, and or an unconditional call of a known non-returning function. Third, prescan code analyzer 320 is configured to determine a set of PERFORM calls, SET(perform), made by region, R.

COBOL source code control flow analyzer 326 is configured to receive inputs from at least prescan code analyzer 320. In particular, COBOL source code control flow analyzer 326 receives for reach region R (1.) a set of regions, SET(goto), that are directly reachable from R, (2.) a set of regions, SET (trickle), that contains regions that control flow would trickle into from R, and (3.) a set of PERFORM calls, SET(perform), made by region, R. COBOL source code control flow analyzer 326 consumes these inputs and calculates a PERFORM range and a set of regions, SET(reachable), that are reachable, thereby excluding unreachable regions or code. First, COBOL source code control flow analyzer 326 starts with an entry point into the program. Second, COBOL source code control flow analyzer 326 calculates the set of regions reachable, and aggregates or adds the set of reachable regions to a set of total regions that are reachable. Third, COBOL source code control flow analyzer 326 determines a set of PERFORM instructions for each of the regions. Fourth, each of the PERFORM instructions are analyzed to determine non-returning instructions and unreturnable instructions, as well as any other instruction that affects control flow that might create unreachable code. If COBOL source code control flow analyzer 326 determines that a PERFORM range under analysis overlaps the set of reached regions, SET(reachable), then an indication is generated that one or more overlapping PERFORM ranges exist. COBOL source code control flow analyzer 326 also generates a set of all reachable regions, SET(all_reachable), as well as a calculated PERFORM range associated with a PERFORM instruction. COBOL source code control flow analyzer 326 analyzes each of the PERFORM instructions, whereby, upon termination, any unprocessed regions can include flow-affected code, which is deemed unreachable. COBOL source code control flow analyzer 326 also can generate an indication that overlapped PERFORM ranges exist.

Code flow optimizer 324 is configured to optimize the COBOL source code as converted into a target native code. For example, code flow optimizer 324 is configured to resolve the multiplicity of entry and exit points associated with overlapping PERFORM ranges. Code flow optimizer 324 can be configured to perform other source code optimizations, too. For example, an ALTER statement that gives rise to an alterable paragraph can be implemented as a multi-way GOTO statement that specifies its targets based on conditions. The control flow graph for the perform region so produced is a single entry, singe exit, rooted directed graph. This allows for the fast and efficient application of standard optimization techniques to COBOL programs. It further allows for a relatively fast and efficient partitioning of a perform range into smaller pieces. The above-described functionalities of code flow optimizer 324 are examples and are not intended to be limiting. As such, code flow optimizer 324 can perform a variety of techniques to optimize the conversion of COBOL source code into object-oriented languages.

Figures 4, 5A:
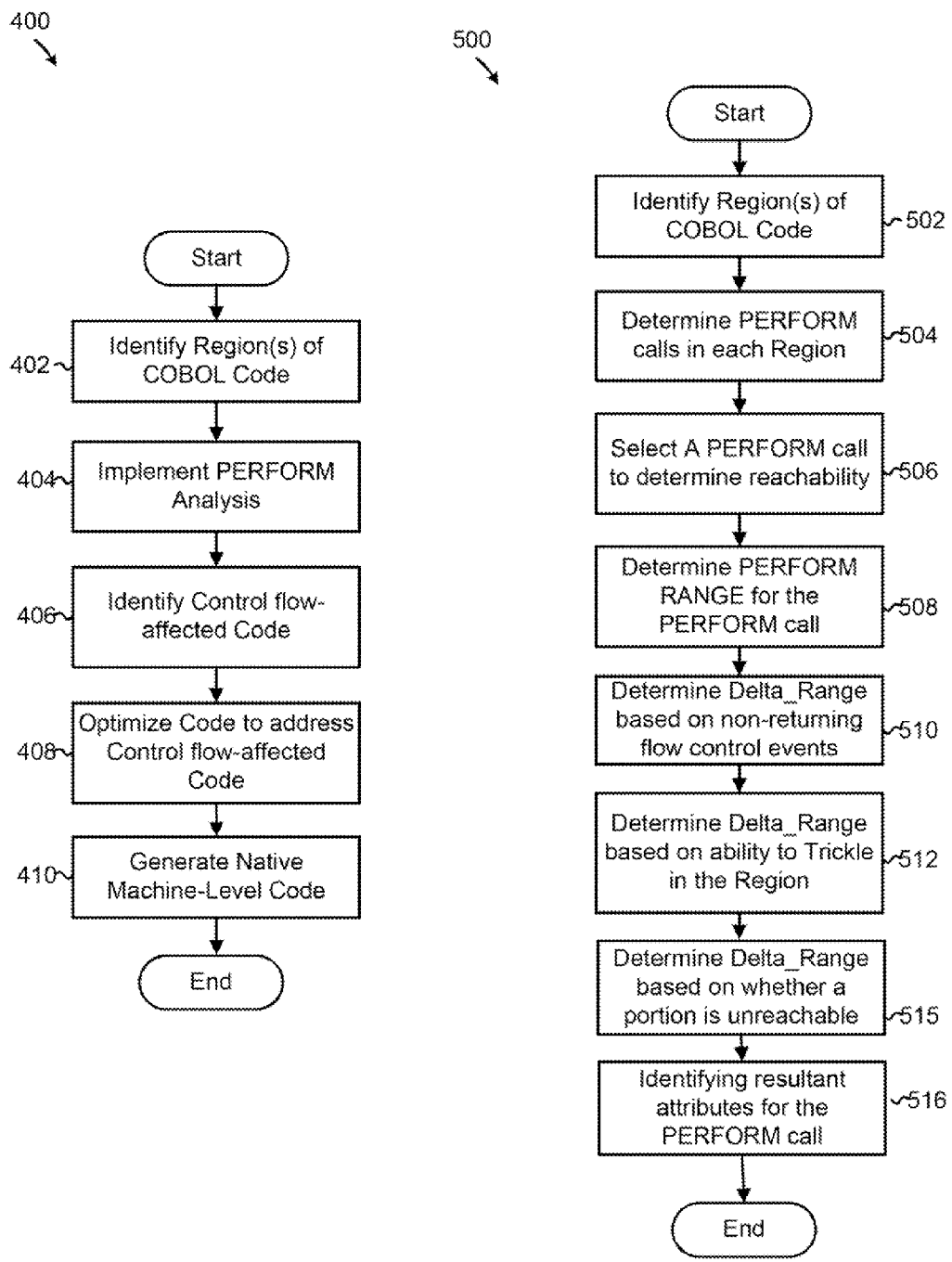
FIG. 4 illustrates an example of a flow for compiling COBOL source code into native code of object-oriented programming languages, according to some embodiments.
FIG. 5A illustrates an example of a flow for performing a PERFORM analysis, according to some embodiments.

FIG. 4 illustrates an example of a flow for compiling COBOL source code into native code of object-oriented programming languages, according to some embodiments. At 402 of flow 400, a compiler or any other program and/or computing device identifies one or more regions of COBOL source code. PERFORM analysis is performed at 404 to identify instructions that may affect control flow that results in flow-affected code, which is identified at 406. At 408, the COBOL source code is optimized to address the flow-affected code that is unreachable. For example, the flow-affected code can be omitted from direct conversion of COBOL source code to Java bytecode. At 410, the compiler can generate native code as bytecode or machine-level code.

FIG. 5A illustrates an example of a flow for performing a PERFORM analysis, according to some embodiments. Flow 500 can be implemented by the above-described global optimizer or any other element of a direct source code compiler. At 502, flow 500 identifies a set of regions of COBOL source code. In some embodiments, the set of regions includes a set of entries, with each entry specifying an entry point. In some cases, each entry point can be considered as, or associated with, a PERFORM instruction (such associations can treat an entry point as a dummy or pseudo PERFORM instruction). Regardless, a number of PERFORM instructions are determined for each region in the set of regions. A total number of PERFORM instructions can be determined for the set of regions at 504. At 506, a PERFORM instruction (or call) is selected from the total number of PERFORM instructions to determine reachability of the corresponding source code. A paragraph or region that is reachable can be added to a count reflecting a total PERFORM range for the selected PERFORM instruction. The selected PERFORM instruction is removed from a set of PERFORM instructions for subsequent PERFORM instruction evaluations. At 508, the PERFORM range for the PERFORM instruction is determined, and any adjustments (e.g., due to unreachable code) are determined subsequent to 508.

Processing from 510 to 515 can reduce the amount of the total PERFORM range due to detection of unreachable code. For example, at 510 the range associated with unreachable code can be removed (e.g., Delta_Range) from the total PERFORM range for the selected PERFORM instruction based on, for example, the existence of non-returning flow control events, such as a GOTO instruction. Thus, the output representing a set of regions, SET(goto), that are directly reachable by GOTO instructions is used to determine the Delta_Range. At 512, the ability to trickle in a region is evaluated to determine whether there is potentially unreachable code associated with the absence of the ability to trickle. Here, the set, SET(trickle), that was determined by a prescan code analyzer can be used, where the set, SET(trickle), contains the regions that control flow would trickle into. If trickling is not possible, then flow-affected code may be determined to be unreachable. If so, the flow-affected code is removed, as Delta_Range, from the total PERFORM range for the selected PERFORM instruction. At 516, flow 500 determines a difference between a set of PERFORM instructions and the number of PERFORM instructions reached, whereby the difference indicates an amount of the PERFORM range that is unreachable. Accordingly, the PERFORM range for the selected PERFORM instruction can be determined. Note that 510 to 515 are repeated for other PERFORM instructions. At 516, a set of resultant attributes are identified for all the PERFORM instructions, the attributes including an indication whether overlapped ranges exist, the PERFORM range for a specific PERFORM instruction, and a set of reachable regions.

Figure 5B:
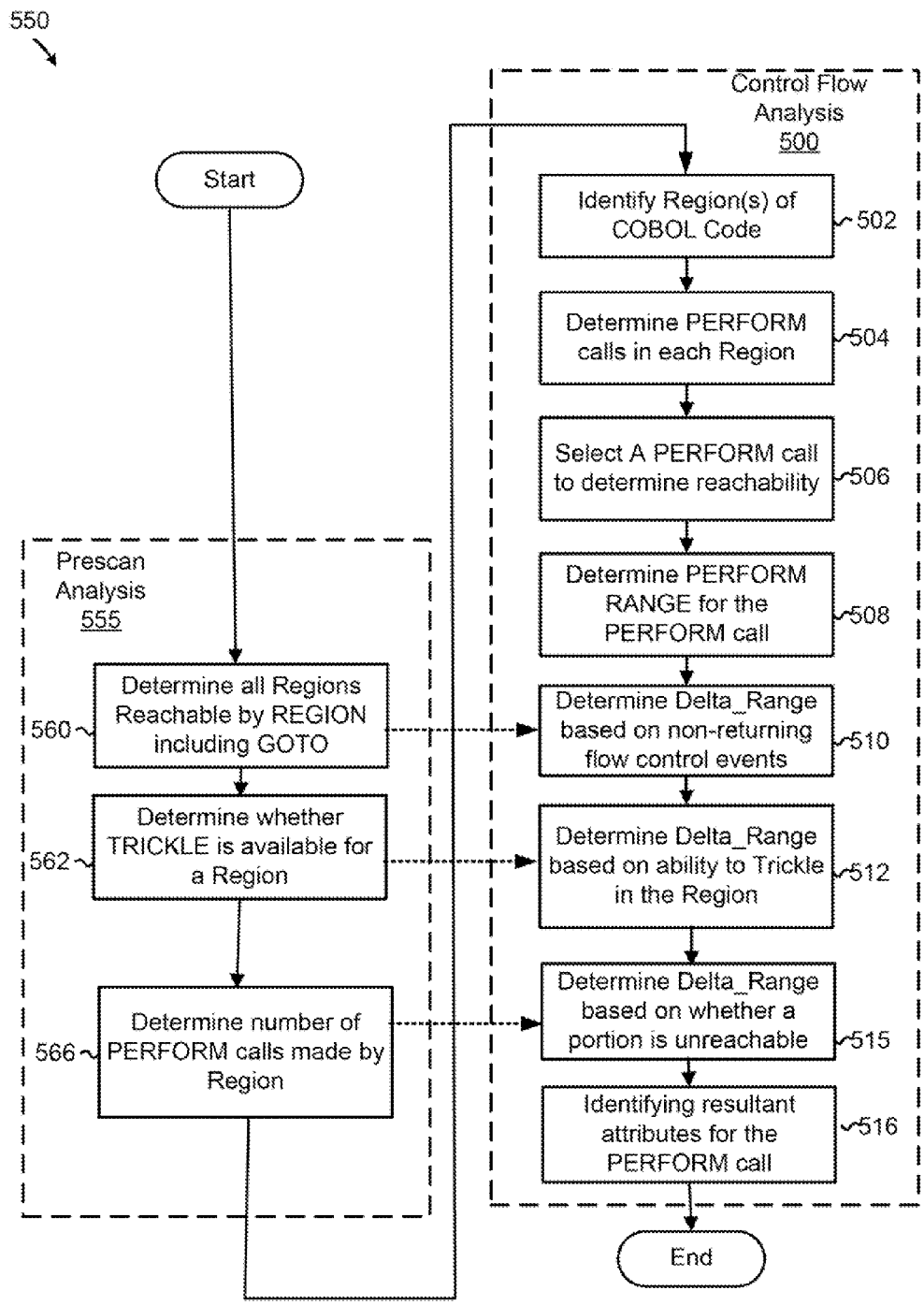
FIG. 5B illustrates an example of performing a PERFORM analysis that includes a flow for prescan analysis, according to some embodiments.

FIG. 5B illustrates an example of performing a PERFORM analysis that includes a flow for prescan analysis, according to some embodiments. Flow 550 includes a control flow analysis as flow 500, as described in FIG. 5A, and a prescan analysis flow 555. Flow 555 can be implemented by the above-described prescan code analyzer, any other element of a direct source code compiler, or any computing device. At 516, all other regions that are reachable by a region that includes a GOTO instruction (or call) is determined. This information can be provided to 510 of flow 500. At 562, the ability to trickle for a region is determined. If the region is not associated with another PERFORM instruction, then trickling may be possible. This information can be provided to 512 of flow 500. At 566, a determination is made as to the number of PERFORM calls made by specific region, with this information being passed to 515 of flow 500. Flow 555 continues to 502 for further processing in accordance with flow 500.

FIGS. 6A and 6B illustrate examples of a technique for determining overlapping PERFORM ranges, according to some embodiments. Flows 600 and 620 can be implemented by the above-described code flow optimizer, any other element of a direct source code compiler, or any computing device. At this point, the following is known subsequent to operation of the above-described global optimizer: the set of PERFORM instructions that are reachable, the PERFORM range of each of these PERFORM instructions, and whether there is an overlap in PERFORM ranges. First, a PERFORM instruction is selected, at 602, from a set of PERFORM instructions. At 604, flow 600 detects an overlap between two PERFORM instructions and their respective PERFORM ranges. This can be accomplished by a union of PERFORM ranges as flow 600 is repeated for a subsequently selected PERFORM instruction, whereby the union of PERFORM ranges acts to accumulate the PERFORM ranges. As a PERFORM is evaluated during subsequent passes through flow 600, a PERFORM range can be identified as overlapping at least one other PERFORM range as that range is in the accumulated set of PERFORM ranges. At 608, flow 600 identifies multiple overlapping occurrences (e.g., pairs of overlapping PERFORMS ranges). FIG. 6B depicts a subsequent pass after flow 600 to compare each of the PERFORM ranges against those already known to be overlapping to calculate an individual equivalence class. To do so, flow 620 selects a known overlapping PERFORM instruction and corresponding range at 622. At 624, flow 620 finds all PERFORM ranges that overlap with it directly or indirectly. At 626, flow 620 identifies an overlapping PERFORM ranges as an equivalence class by iterating until no more are found. At 628, flow 620 continues by iterating until the set of overlapping PERFORM instructions are determined.

Figure 7:
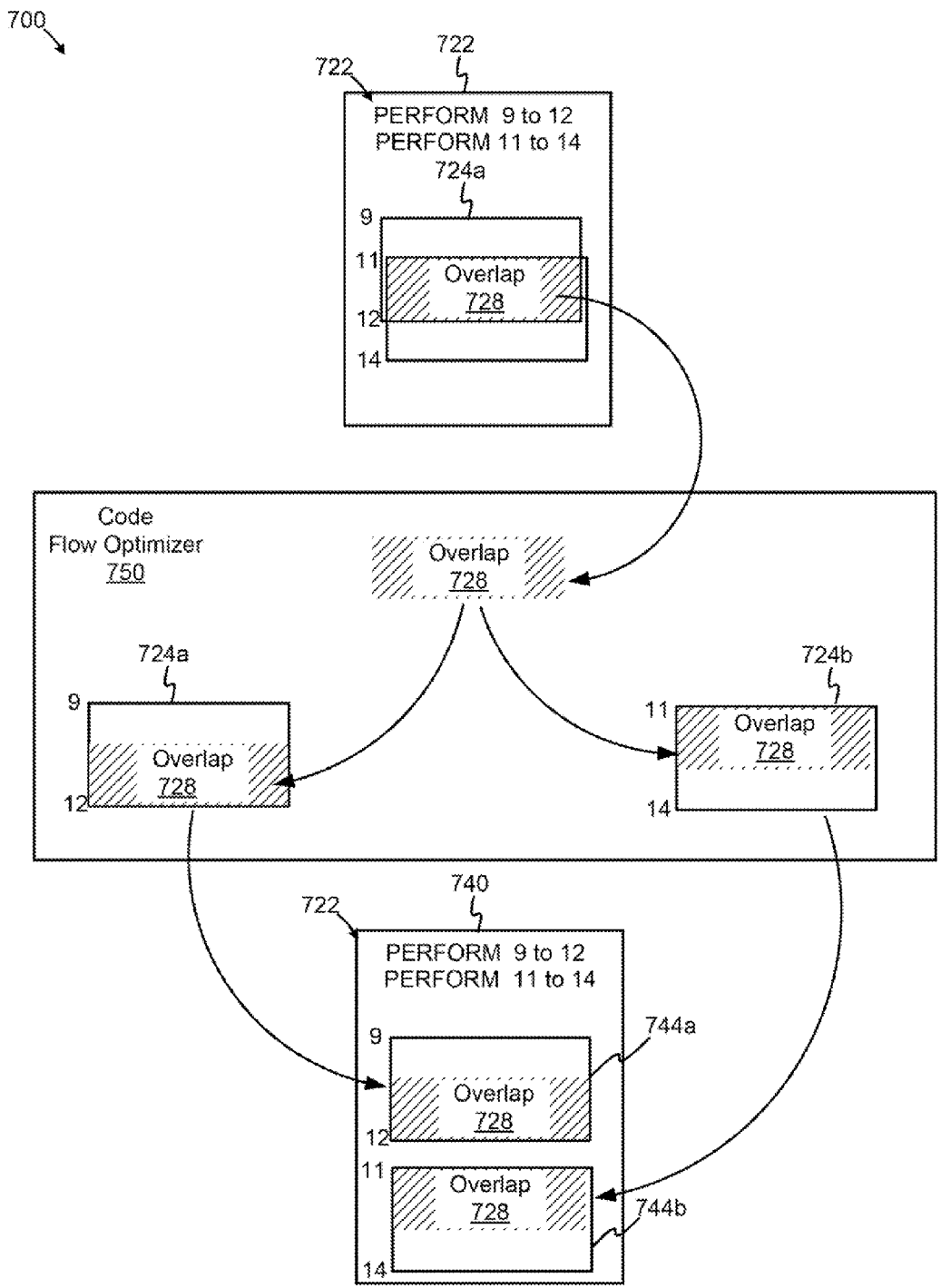
FIG. 7 illustrates an example of a technique for resolving overlapping PERFORM ranges, according to some embodiments.
Figure 8:
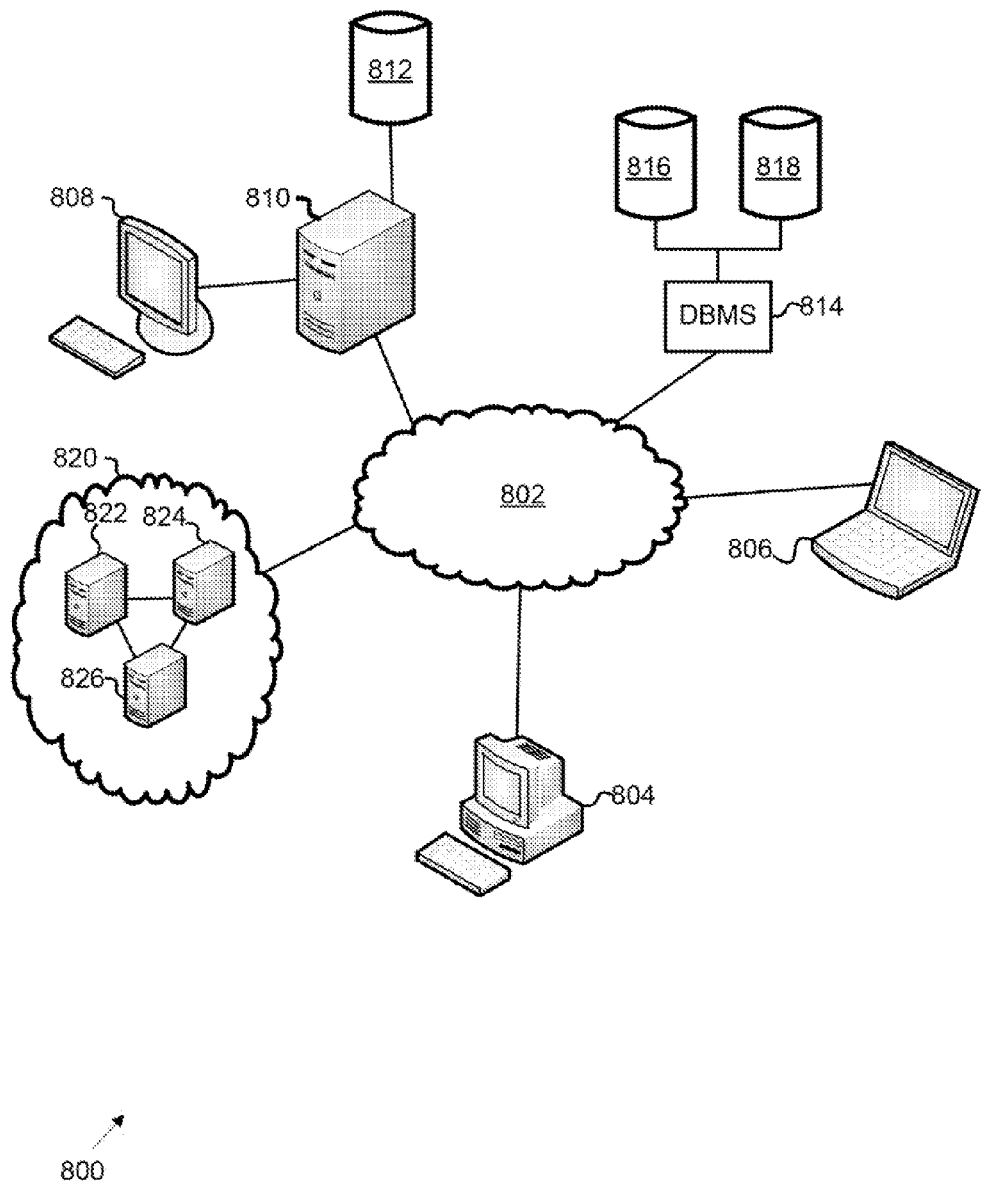
FIG. 8 illustrates an exemplary system for implementing PERFORM analysis in COBOL-sourced programs for conversion to object-oriented program structures, according to some embodiments.

FIG. 7 illustrates an example of a technique for resolving overlapping PERFORM ranges, according to some embodiments. Flow 700 can be implemented by the above-described code flow optimizer or any other element of a direct source code compiler. Code flow optimizer 750 of FIG. 7 operates to resolve the multiple entry and exit points that accompany overlapping PERFORM ranges. As shown, code flow optimizer 750 can determine an overlap code portion 728 in code 722 due to, for example, two PERFORM instructions 722 that cause instructions common to both PERFORM ranges to be executed. To resolve this, code flow optimizer 750 clones the overlap code portion 728 to form two different pieces of code: code piece 724a and code piece 724b. Subsequently, code flow optimizer 750 forms two separate code portions 744a and 744b that include cloned versions of overlap code portion 728, thereby providing for a single entry and exit for both code portions 744a and 744b. Code flow optimizer 750 can also resolve overlapping PERFORM ranges using different techniques, such as modeling overlapping PERFORM regions as a single procedure that has one entry at the top and one exit at the end. On entry to the procedure, a multi-way branch can be performed to the actual entry point into the PERFORM instruction. At the end of each PERFORM region, the end reference is checked and, if it matches, then the code jumps to the exit code at the end of the procedure FIG. 8 illustrates an exemplary system for implementing PERFORM analysis in COBOL-sourced programs for conversion to object-oriented program structures, according to some embodiments. Here, system 800 includes network 802, clients 804-810, database 812, database management system (DBMS) 814, networked storage 816-818, and computing cloud 820 including processors 822-826. In some examples, system 800 may be used completely or partially to implement the techniques described. However, the described techniques are not limited to any given topology or system architecture and the elements shown may be varied in design, layout, structure, architecture, functionality, or other aspects and are not limited to the examples shown and described.

Figure 9:
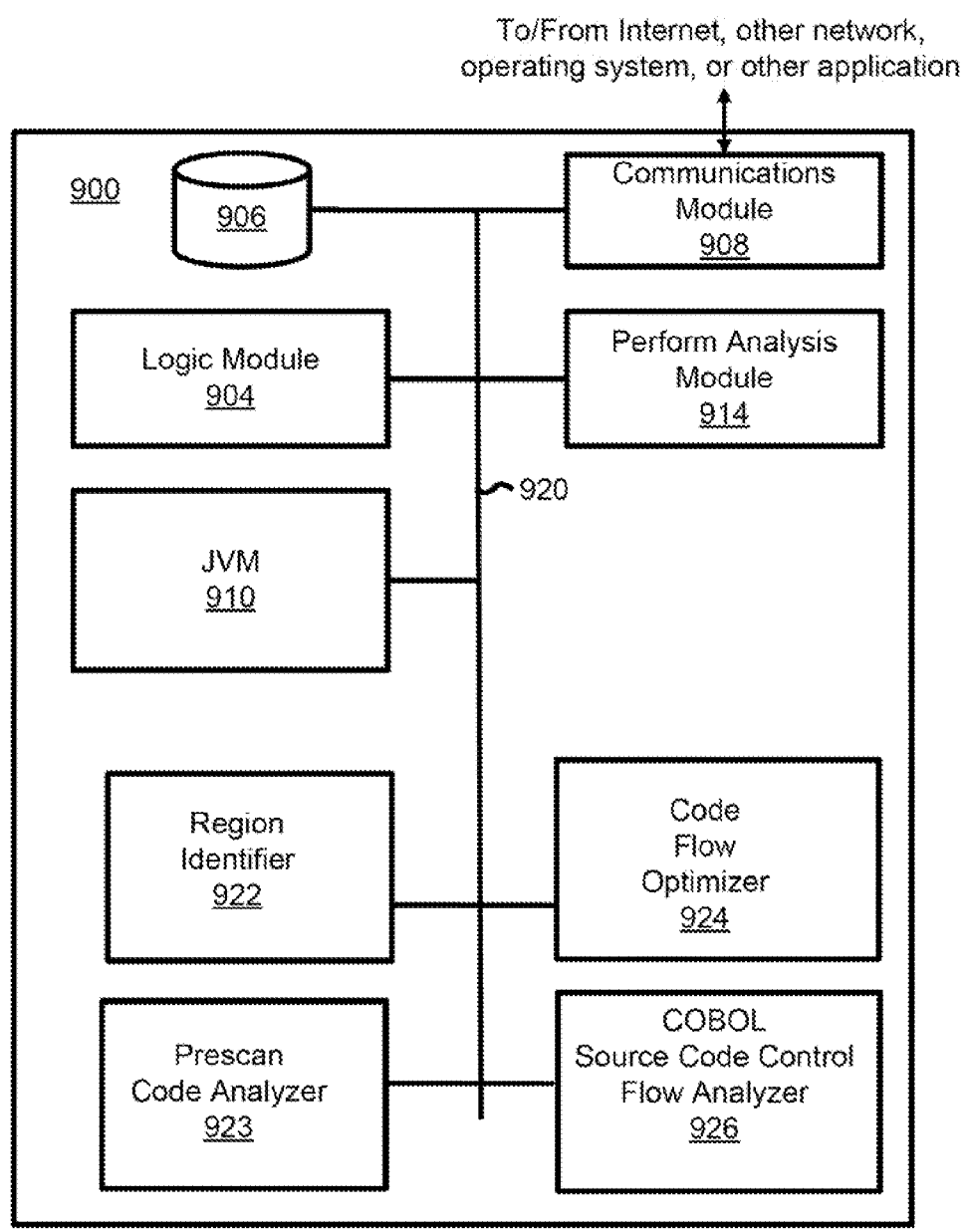
FIG. 9 illustrates an exemplary application architecture for implementing PERFORM analysis in COBOL-sourced programs for conversion to object-oriented program structures.

FIG. 9 illustrates an exemplary application architecture for implementing PERFORM analysis in COBOL-sourced programs for conversion to object-oriented program structures. Here, application 900 includes logic module 904, storage 906, communications module 908, Java® virtual machine ("JVM") 910, a PERFORM analysis module 914, a prescan code analyzer module 923, a region identifier module 922, a code flow optimizer module 924, and a COBOL source code control flow analyzer module 926. Each of the above-described modules may be implemented using software, hardware, firmware, circuitry, or a combination thereof. The described techniques for perform analysis or method splitting may be implemented using this exemplary application architecture. In other examples, the exemplary application architecture may be varied and is not limited to the examples shown and described, which may including modifying the type, quantity, configuration, instantiation, design, structure, or any other aspects of the elements and modules shown.

Figure 10:
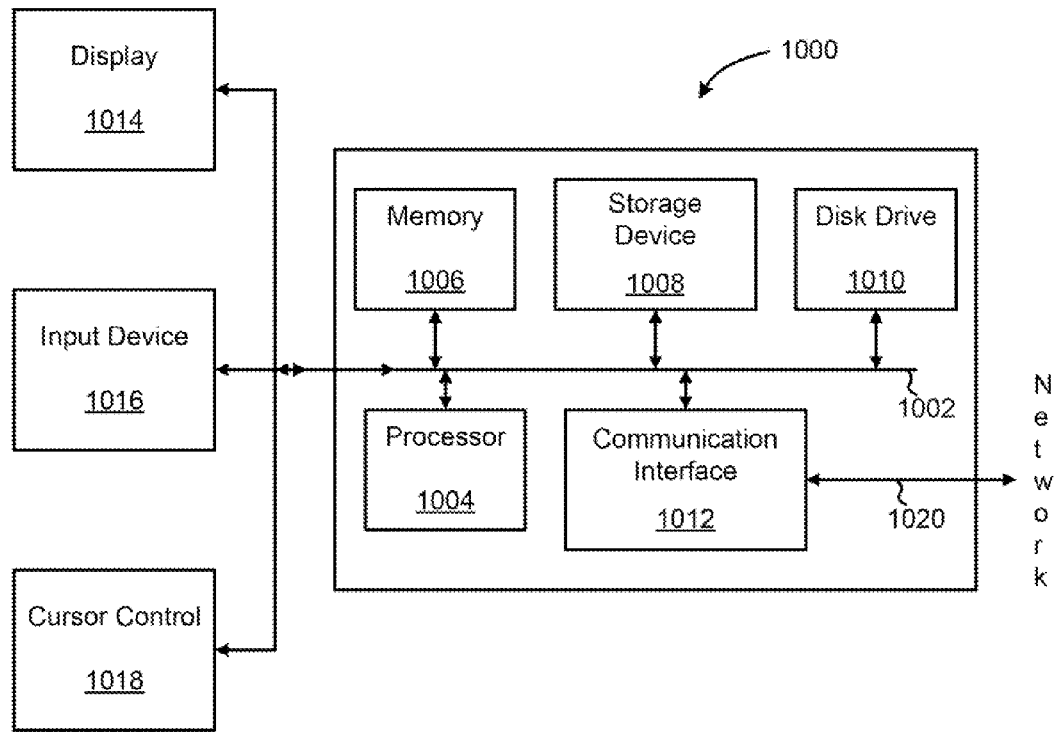
FIG. 10 illustrates an exemplary computer system suitable for implementing the above-identified structures and/or functionalities to facilitate COBOL-sourced programs for conversion to object-oriented program structures.

FIG. 10 illustrates an exemplary computer system suitable for implementing the above-identified structures and/or functionalities to facilitate COBOL-sourced programs for conversion to object-oriented program structures. In some examples, computer system 1000 may be used to implement computer programs, applications, methods, processes, or other software to perform the above-described techniques. Computer system 1000 includes a bus 1002 or other communication mechanism for communicating information, which interconnects subsystems and devices, such as processor 1004, system memory 1006 (e.g., RAM), storage device 1008 (e.g., ROM), disk drive 1010 (e.g., magnetic or optical), communication interface 1012 (e.g., modem or Ethernet card), display 1014 (e.g., CRT or LCD), input device 1016 (e.g., keyboard), and cursor control 1018 (e.g., mouse or trackball). According to some examples, computer system 1000 performs specific operations by processor 1004 executing one or more sequences of one or more instructions stored in system memory 1006. Such instructions may be read into system memory 1006 from another computer readable medium, such as static storage device 1008 or disk drive 1010. In some examples, hard-wired circuitry may be used in place of or in combination with software instructions for implementation.

The term "computer readable medium" refers to any tangible medium that participates in providing instructions to processor 1004 for execution. Such a medium may take many forms, including but not limited to, non-volatile media and volatile media. Non-volatile media includes, for example, optical or magnetic disks, such as disk drive 1010. Volatile media includes dynamic memory, such as system memory 1006. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1002 for transmitting a computer data signal. In some examples, execution of the sequences of instructions may be performed by a single computer system 1000. According to some examples, two or more computer systems 1000 coupled by communication link 1020 (e.g., LAN, PSTN, or wireless network) may perform the sequence of instructions in coordination with one another. Computer system 1000 may transmit and receive messages, data, and instructions, including program, i.e., application code, through communication link 1020 and communication interface 1012. Received program code may be executed by processor 1004 as it is received, and/or stored in disk drive 1010, or other non-volatile storage for later execution.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method, executed by a computer, comprising:
   identifying one or more regions of COBOL source code having an entry point;
   selecting a PERFORM instruction associated with the entry point to analyze;
   determining a PERFORM range for the selected PERFORM instruction;
   identifying an instruction that changes control flow in execution of the COBOL source code subsequent to the selected PERFORM instruction;
   determining flow-affected code resulting from the instruction;
   determining reachable regions from the one or more regions of the COBOL source code for the selected PERFORM instruction; and
   forming an adjusted PERFORM range for the selected PERFORM instruction based on the determined reachable regions.

2. The method of claim 1 further comprising:
   decomposing the adjusted PERFORM range into adjusted PERFORM range portions; and
   generating methods operable in a native programming language for execution by a virtual machine, wherein the methods are formed from the adjusted PERFORM range portions.

3. The method of claim 1 wherein forming the adjusted PERFORM range comprises:
   determining if the flow-affected code is unreachable code; and
   omitting a portion of the PERFORM range including the flow-affected code.

4. The method of claim 3 further comprising:
   converting the determined reachable regions from the one or more regions of the COBOL source code into a native code of another programming language without compiling source code for the another programming language.

5. The method of claim 1 further comprising:
   identifying the instruction as a non-returning instruction; and
   determining that the flow-affected code includes a subset of regions in the one or more regions of the COBOL source code that are reachable by the non-returning instruction.

6. The method of claim 5 wherein determining the flow-affected code resulting from the instruction comprises:
   determining unreachable code.

7. The method of claim 5 wherein identifying the instruction as the non-returning instruction comprises:
   identifying the instruction as one of a subset of non-returning instructions,
   wherein the instruction is a GOTO COBOL-based instruction.

8. The method of claim 1 further comprising:
   identifying the instruction as a unreturnable instruction; and
   determining that the flow-affected code is in a region from which execution of the selected PERFORM instruction does not trickle through an intermediate portion of the PERFORM range to a subsequent PERFORM instruction.

9. The method of claim 8 further comprising:
detecting whether the intermediate portion of the PERFORM range is a target of a change in control flow; and
including the intermediate portion of the PERFORM range from reachable regions if the intermediate portion of the PERFORM range is the target of the change in control flow, otherwise excluding the intermediate portion of the PERFORM range from the reachable regions.

10. The method of claim 1 further comprising:
determining that the flow-affected code is an overlap in the COBOL source code; and
resolving the overlap.

11. The method of claim 10 wherein resolving the overlap comprises:
cloning a portion of the COBOL source code in the overlap to form a cloned portion of the COBOL source code; and
creating independent PERFORM ranges, wherein each of the independent PERFORM ranges includes the cloned portion of the COBOL source code.

12. The method of claim 1 further comprising:
creating independent PERFORM ranges; and
sizing one or more of the independent PERFORM ranges to comport with a range of a method that includes executable byte code for a native programming language.

13. The method of claim 12 wherein the native programming language comprises an object-oriented programming language.

14. A system comprising:
a processor; and
a memory, wherein the memory stores a compiler, and wherein the compiler comprises:
 a global optimizer configured to analyze execution flow for a range of blocks of source code in the memory to determine flow-affected code; and
 a native code generator configured to generate native code based on representations of the native code as functions of source code, wherein the native code generator is further configured to optimize the flow-affected code by resolving overlapping PERFORM ranges, wherein the native is configured to be executed on a virtual machine, wherein the source code includes instructions in COBOL programming language, and wherein the overlapping PERFORM ranges are detected by:
  identifying one or more regions of COBOL source code having an entry point;
  selecting a PERFORM instruction associated with the entry point to analyze;
  determining a PERFORM range for the selected PERFORM instruction;
  identifying an instruction that changes control flow in execution of the COBOL source code subsequent to the selected PERFORM instruction;
  determining flow-affected code resulting from the instruction;
  determining reachable regions from the one or more regions of the COBOL source code for the selected PERFORM instruction; and
  forming an adjusted PERFORM range for the selected PERFORM instruction based on the determined reachable regions.

15. The system of claim 14 wherein the native code is byte code.

16. The system of claim 14 further comprising:
a region identifier configured to identify one or more regions of COBOL source code associated with a returnable flow transfer instruction.

17. The system of claim 16 wherein the region identifier is further configured to identify a region as being delimited between an entry point and a target point.

18. The system of claim 14 wherein the native code generator is further configured to optimize the flow-affected code by omitting the flow-affected code.

19. A computer program product embodied in a non-transitory computer readable medium and comprising computer instructions configured to:
identify one or more regions of COBOL source code having an entry point;
select a PERFORM instruction associated with the entry point to analyze;
determine a PERFORM range for the selected PERFORM instruction;
identify an instruction that changes control flow in execution of the COBOL source code subsequent to the selected PERFORM instruction;
determine flow-affected code resulting from the instruction;
determine reachable regions from the one or more regions of the COBOL source code for the selected PERFORM instruction; and
form an adjusted PERFORM range for the selected PERFORM instruction based on the determined reachable regions.

20. The computer program product of claim 19 further comprising computer instructions configured to:
decompose the adjusted PERFORM range into adjusted PERFORM range portions; and
generate methods operable in a native programming language for execution by a virtual machine, wherein the methods are formed from the adjusted PERFORM range portions.

21. The computer program product of claim 19 wherein forming the adjusted PERFORM range comprises computer instructions configured to:
determine if the flow-affected code is unreachable code; and
omit a portion of the PERFORM range including the flow-affected code.

22. The computer program product of claim 21 further comprising computer instructions configured to:
convert the determined reachable regions from the one or more regions of the COBOL source code into a native code of another programming language without compiling source code for the another programming language.

* * * * *